US012725382B2

(12) United States Patent
Wang et al.

(10) Patent No.: US 12,725,382 B2
(45) Date of Patent: Sep. 1, 2026

(54) DIGITAL HUMAN GENERATION METHOD, PLATFORM, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Lei Wang, Beijing (CN); Xiaodong Zhang, Beijing (CN); Shiyan Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 156 days.

(21) Appl. No.: 18/748,083

(22) Filed: Jun. 19, 2024

(65) Prior Publication Data

US 2025/0124680 A1 Apr. 17, 2025

(30) Foreign Application Priority Data

Oct. 16, 2023 (CN) ........................ 202311338975.0

(51) Int. Cl.
*G06T 19/20* (2011.01)
*G06T 7/33* (2017.01)

(52) U.S. Cl.
CPC .............. *G06T 19/20* (2013.01); *G06T 7/337* (2017.01); *G06T 2200/24* (2013.01);
(Continued)

(58) Field of Classification Search
CPC ................................ G06T 19/20; G06T 7/337
See application file for complete search history.

(56) References Cited

U.S. PATENT DOCUMENTS

2011/0246329 A1* 10/2011 Geisner .................. G06F 3/017 715/757
2014/0192212 A1* 7/2014 He ........................ G02B 13/06 399/296

(Continued)

FOREIGN PATENT DOCUMENTS

CN 108319939 A 7/2018
CN 109087386 A 12/2018

(Continued)

OTHER PUBLICATIONS

First Office Action for JP2024-100035, issued on Apr. 15, 2025, 2 pgs.

(Continued)

*Primary Examiner* — Yi Yang
(74) *Attorney, Agent, or Firm* — Kwan & Olynick LLP

(57) ABSTRACT

A digital human generation method, an electronic device and a storage medium are disclosed. The solution relates to the fields of augmented reality technologies, virtual reality technologies, computer vision technologies, deep learning technologies, or the like, and can be applied to scenarios, such as metaverse, a virtual digital human, or the like. An implementation includes: acquiring a corresponding target object model based on a picture of a to-be-generated digital human; acquiring a corresponding point cloud of a head key feature in the picture from a pre-configured feature library based on the head key feature; and fusing the point cloud of the head key feature in the target object model to obtain a digital human figure.

16 Claims, 6 Drawing Sheets

(52) U.S. Cl.
CPC ............... *G06T 2207/10028* (2013.01); *G06T 2207/30201* (2013.01); *G06T 2210/56* (2013.01); *G06T 2219/2004* (2013.01)

(56) References Cited

U.S. PATENT DOCUMENTS

| | | | | |
|---|---|---|---|---|
| 2018/0088340 | A1* | 3/2018 | Amayeh | G06V 40/169 |
| 2018/0253593 | A1 | 9/2018 | Hu et al. | |
| 2021/0390792 | A1* | 12/2021 | Xu | G06V 40/168 |
| 2022/0284678 | A1* | 9/2022 | Chen | G06T 7/90 |

FOREIGN PATENT DOCUMENTS

| | | | |
|---|---|---|---|
| CN | 114581998 | A | 6/2022 |
| CN | 116051722 | A | 5/2023 |
| CN | 116168154 | A | 5/2023 |
| CN | 116766596 | A | 9/2023 |
| JP | 2014006873 | A | 1/2014 |
| KR | 20120051659 | A | 5/2012 |

OTHER PUBLICATIONS

First Office Action for CN202311338975.0, issued on Sep. 2, 2024, 7 pgs.
Notice Of Allowance for CN202311338975.0, issued on Feb. 27, 2025, 4 pgs.
Second Office Action for CN202311338975.0, issued on Nov. 25, 2024, 8 pgs.
First Office Action for KR1020240119066, issued on Mar. 17, 2026.

* cited by examiner

DIGITAL HUMAN GENERATION METHOD, PLATFORM, ELECTRONIC DEVICE AND STORAGE MEDIUM

CROSS-REFERENCE TO RELATED APPLICATIONS

The present disclosure claims priority and benefit of Chinese Patent Application No. 202311338975.0, entitled "Digital human Generation Method, Platform, Electronic Device and Storage Medium", filed on Oct. 16, 2023, which is incorporated herein by reference in its entirety.

TECHNICAL FIELD

The present disclosure relates to the fields of computer technologies and artificial intelligence technologies, and particularly to the fields of augmented reality technologies, virtual reality technologies, computer vision technologies, deep learning technologies, or the like, can be applied to scenarios, such as metaverse, a virtual digital human, or the like, and more particularly to a digital human generation method, an electronic device and a storage medium.

BACKGROUND

In traditional making of a digital human figure, especially for making of a three-dimensional ultra-realistic digital human figure, investments are required in a plurality of stages of extremely professional original painting, modeling, binding, animation, or the like, an artificial making period is usually as long as several months, an investment cost is extremely high, an effect can only be displayed in stages, and a large number of additional investments are required for operations, such as modification, optimization, or the like.

Moreover, in a traditional technology, the artificially made digital human figure has high recovery difficulty for ideal character features in the real world, such as an eye shape, a lip shape, or the like, and a final presented effect of the figure is greatly limited by a personal ability level of each link in the making of a digital human.

SUMMARY

The present disclosure provides a digital human generation method, an electronic device and a storage medium.

According to an aspect of the present disclosure, there is provided a digital human generation method, including:

- acquiring a corresponding target object model based on a picture of a to-be-generated digital human;
- acquiring a corresponding point cloud of a head key feature in the picture from a pre-configured feature library based on the head key feature; and
- fusing the point cloud of the head key feature in the target object model to obtain a digital human figure.

According to another aspect of the present disclosure, there is provided an electronic device, including:

- at least one processor; and
- a memory connected with the at least one processor communicatively;
- wherein the memory stores instructions executable by the at least one processor to enable the at least one processor to perform the method of the aspect as described above and any possible implementation.

According to yet another aspect of the present disclosure, there is provided a non-transitory computer readable storage medium with computer instructions stored thereon, wherein the computer instructions are used for causing a computer to perform the method of the aspect as described above and any possible implementation.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Apparently, the embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a terminal device in the embodiments of the present disclosure may include, but is not limited to, a mobile phone, a personal digital assistant (PDA), a wireless handheld device, a tablet computer, and other smart devices; a display device may include, but not limited to, a personal computer, a television, and other devices with a display function.

In addition, the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects have a relationship of "or".

Digital human making in a traditional technology basically depends on manual work, such that a making cost is high, and a made digital human has low accuracy and a poor effect.

Figure 1:
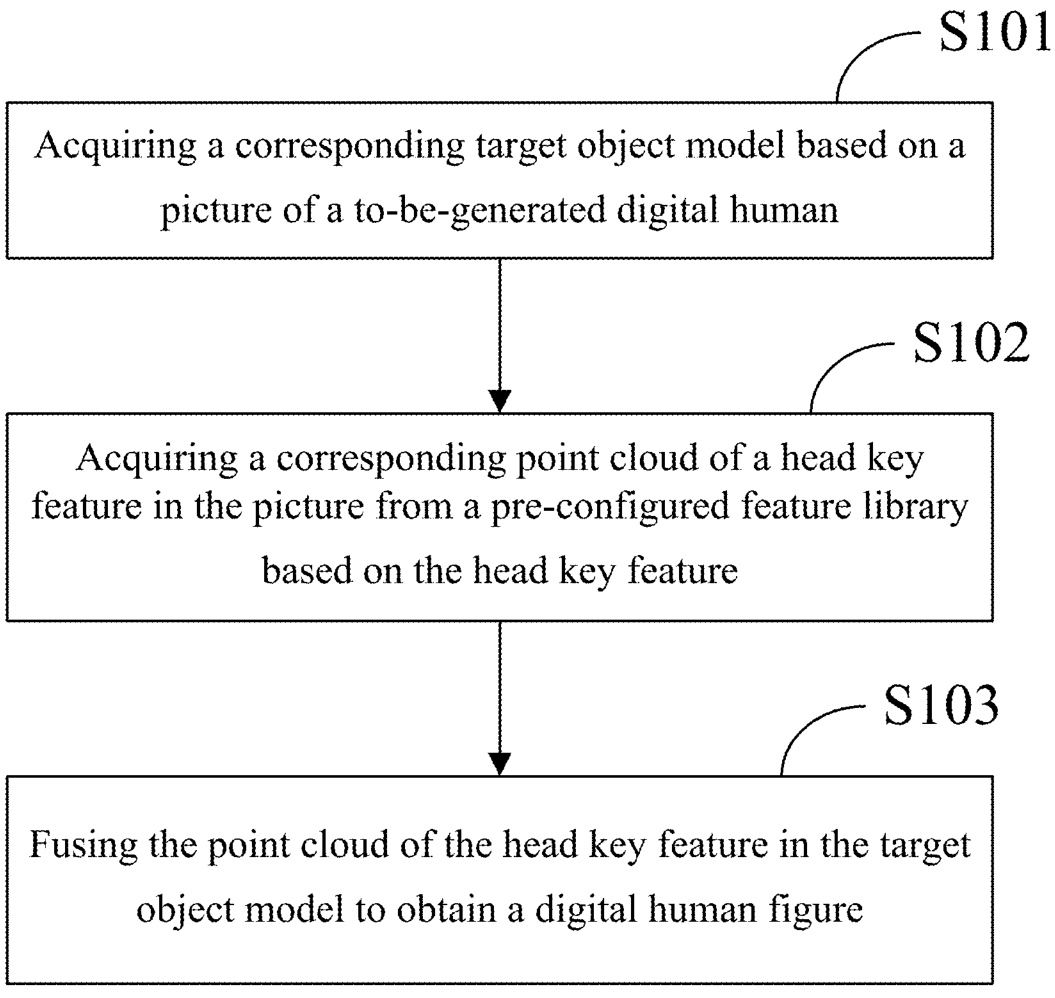
FIG. 1 is a schematic diagram according to a first embodiment of the present disclosure.

FIG. 1 is a schematic diagram according to a first embodiment of the present disclosure; as shown in FIG. 1, this embodiment provides a digital human generation method, which may include the following steps:

S101: acquiring a corresponding target object model based on a picture of a to-be-generated digital human;

S102: acquiring a corresponding point cloud of a head key feature in the picture from a pre-configured feature library based on the head key feature; and S103: fusing the point cloud of the head key feature in the target object model to obtain a digital human figure.

A digital human generation platform may serve as the subject for executing the digital human generation method according to this embodiment, and may be a software-integrated platform which can automatically realize generation of the digital human. Alternatively, a corresponding electronic device may be configured based on the platform for implementing the generation of the digital human.

In this embodiment, the corresponding digital human figure may be automatically generated based on the picture of the to-be-generated digital human. The picture of the to-be-generated digital human is a two-dimensional (2D) picture. The digital human figure may be a 3D digital human figure.

Since features of the digital human are mainly concentrated on the head and a facial region of the head in the generated digital human figure, in this embodiment, the picture of the to-be-generated digital human may be a front picture including the head of a character; for example, the picture may be only a head image, or an upper body image including features of the head of the character.

The target object model of this embodiment may be a prototype of a pre-created digital human model. In order to improve an efficiency of generating the digital human, in this embodiment, the prototype of the digital human model is not required to be created, and the corresponding digital human figure is generated directly based on the obtained target object model.

Since the features of the digital human are mainly concentrated on the head, in this embodiment, for each head key feature in the picture, the corresponding point cloud of the head key feature can be obtained from the feature library and fused in the target object model to finally obtain the digital human figure.

In this embodiment, the head key feature may include at least one feature, such as the eyebrows, the eye, the nose, the mouth, the facial form, or the like, according to a part actually required to be defined.

For the digital human generation method according to this embodiment, with the above technical solution, the digital human can be automatically made to obtain the digital human figure, the problems that the cost is high and the accuracy is poor when the digital human is manually made in multiple stages in the traditional technology are solved, and a making cost and period of the digital human figure can be effectively saved; moreover, the accuracy of the generated digital human figure and the generation efficiency of the digital human figure can be effectively improved, and the generated digital human figure has an ultra-realistic expression effect; meanwhile, a threshold of digital human making can be effectively reduced, and progress of the digital industry is promoted.

Figure 2:
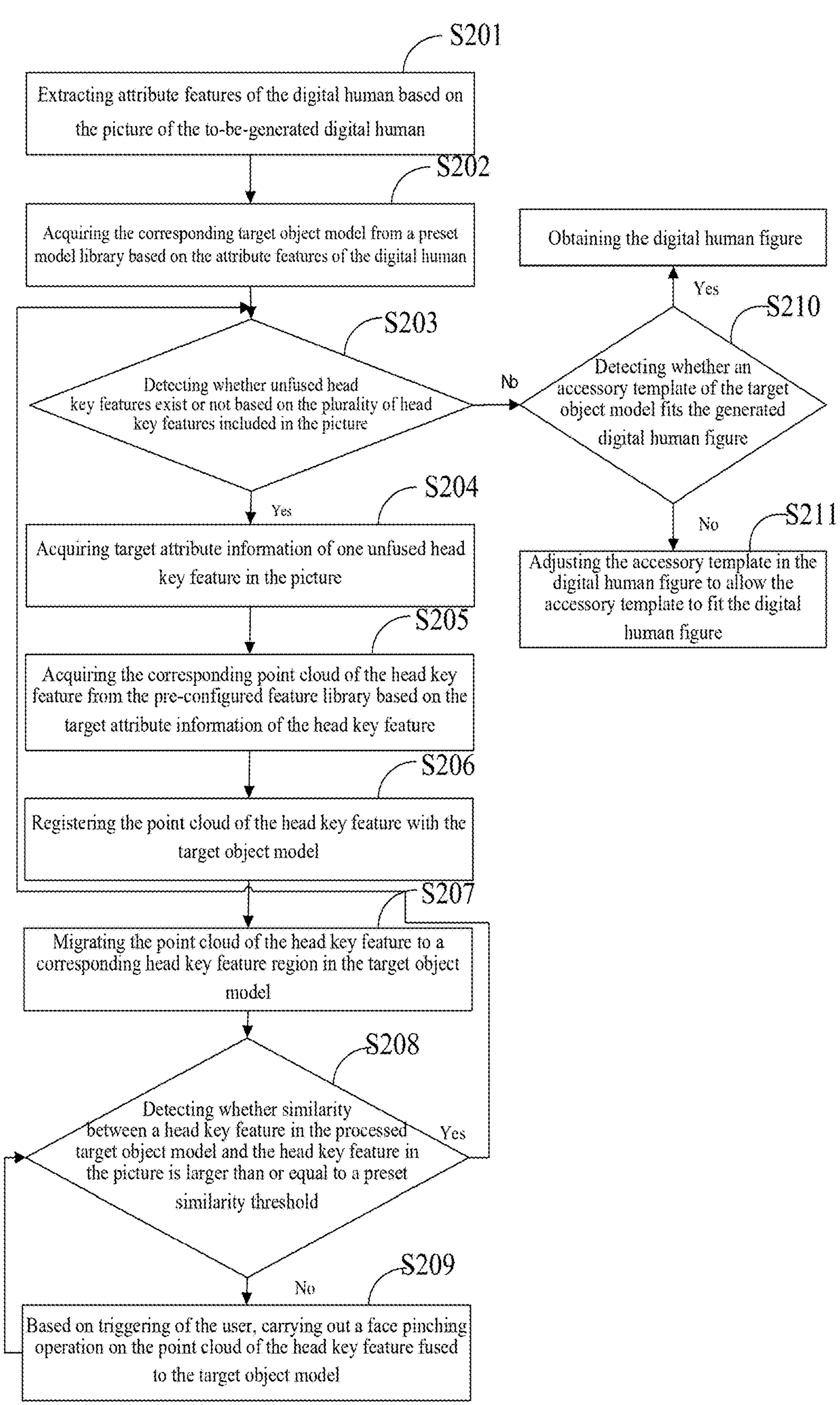
FIG. 2 is a schematic diagram according to a second embodiment of the present disclosure.

FIG. 2 is a schematic diagram according to a second embodiment of the present disclosure; as shown in FIG. 2, this embodiment provides a digital human generation method, and the technical solution of the present disclosure is further described in more detail based on the technical solution of the above-mentioned embodiment shown in FIG. 1. As shown in FIG. 2, the digital human generation method according to this embodiment may include the following steps:

S201: extracting attribute features of the digital human based on the picture of the to-be-generated digital human.

Since the main features of the digital human are concentrated on the head, the picture of the to-be-generated digital human in this embodiment is a front picture including the head, and the picture can clearly present each head key feature region on the front of the head of the character.

For example, in this embodiment, the extraction of the attribute features of the digital human may be implemented by using a pre-trained attribute feature extraction model. The attribute feature extraction model is a pre-trained neural network model, and in use, one picture of the digital human is input into the attribute feature extraction model, and the attribute feature extraction model can extract the attribute features of the character in the picture based on the picture. For example, the attribute features of this embodiment may include a middle-aged female, a middle-aged male, a girl, a boy, an elderly male, an elderly female, or the like.

In addition, optionally, in this embodiment, other algorithms may also be used to analyze the picture of the to-be-generated digital human to acquire the attribute feature of the digital human, which is not limited herein.

S202: acquiring the corresponding target object model from a preset model library based on the attribute features of the digital human.

Since characters with different attribute features have different facial region features, in order to generate the digital human figure more accurately, in this embodiment, the model library may also be preset, and a plurality of object models, such as at least one of a middle-aged female model, a middle-aged male model, a girl model, a boy model, an elderly male model, an elderly female model, or the like, may also be preset in the model library. For each object model, the corresponding attribute features can be set when the object model is set in advance. Therefore, the corresponding target object model can be obtained from the preset model library according to the attribute features of the digital human, and compared with the prior art, the processes of original painting, modeling, or the like, can be directly omitted, and the preset matched target object model is directly used, thus effectively improving a making efficiency of the digital human figure.

Optionally, in one embodiment of the present disclosure, if the attribute features of the digital human are not extracted based on the picture of the to-be-generated digital human, at this point, a pre-configured standard model may be used as the target object model. The standard model may be one model in the preset model library, such as the middle-aged female model. Alternatively, a separate standard model can be additionally preset and used when the attribute features cannot be extracted, so as ensure that a reasonable target object model can be obtained under any condition.

S203: detecting whether unfused head key features exist or not based on the plurality of head key features included in the picture; if yes, executing step S204; otherwise, executing step S210.

Specifically, since the picture may include a plurality of head key features, in order to facilitate the fusion of the head key features to the target object model one by one, after one head key feature is fused at a time, the head key feature may be marked to avoid a repeated operation.

S204: acquiring target attribute information of one unfused head key feature in the picture; executing step S205.

The head key feature of this embodiment may be the eyebrows, the eye, the nose, the mouth, the ear, the facial form, or the like. The corresponding target attribute information may be used to define the head key features; for example, the attribute information of the eye may include an almond eye, a phoenix eye, an eagle eye, an elongated eye, a narrow eye, or the like.

In this embodiment, an attribute extraction model of each head key feature may be trained in advance to extract the target attribute information of the head key feature. Alternatively, the target attribute information of the head key feature in the picture selected by a user based on the picture may also be acquired.

S205: acquiring the corresponding point cloud of the head key feature from the pre-configured feature library based on the target attribute information of the head key feature; executing step S206.

Before the step S205, the method may include: collecting point clouds of a plurality of head key features of each of a plurality of characters and attribute information of the head key features, and storing the point clouds and the attribute information in the feature library.

In this embodiment, the collected multiple characters include characters with different attribute information, such as the middle-aged female, the middle-aged male, the girl, the boy, the elder male, the elder female, or the like. The attribute information of the same head key feature in multiple characters is also different as much as possible, and the head key features with rich and various types of attribute information are required to be included in the feature library, so as to provide effective feature data support for the generation of the digital human. For example, for the eyebrows, point clouds and corresponding eyebrow shape information of eyebrows of characters with different eyebrow shapes are collected as much as possible. For the eye, point clouds and corresponding eye shape information of eyes of characters with different eye shapes are collected as much as possible. For the mouth, point clouds and corresponding mouth shape information of mouths of characters with different mouth shapes are collected as much as possible. Based on the above-mentioned established feature library, when the step S205 is implemented, the digital human generation platform can automatically match the point cloud of the head key feature corresponding to the target attribute information accurately and efficiently according to the target attribute information of the head key feature and all the target attribute information of the head key feature in the feature library.

Figure 3:
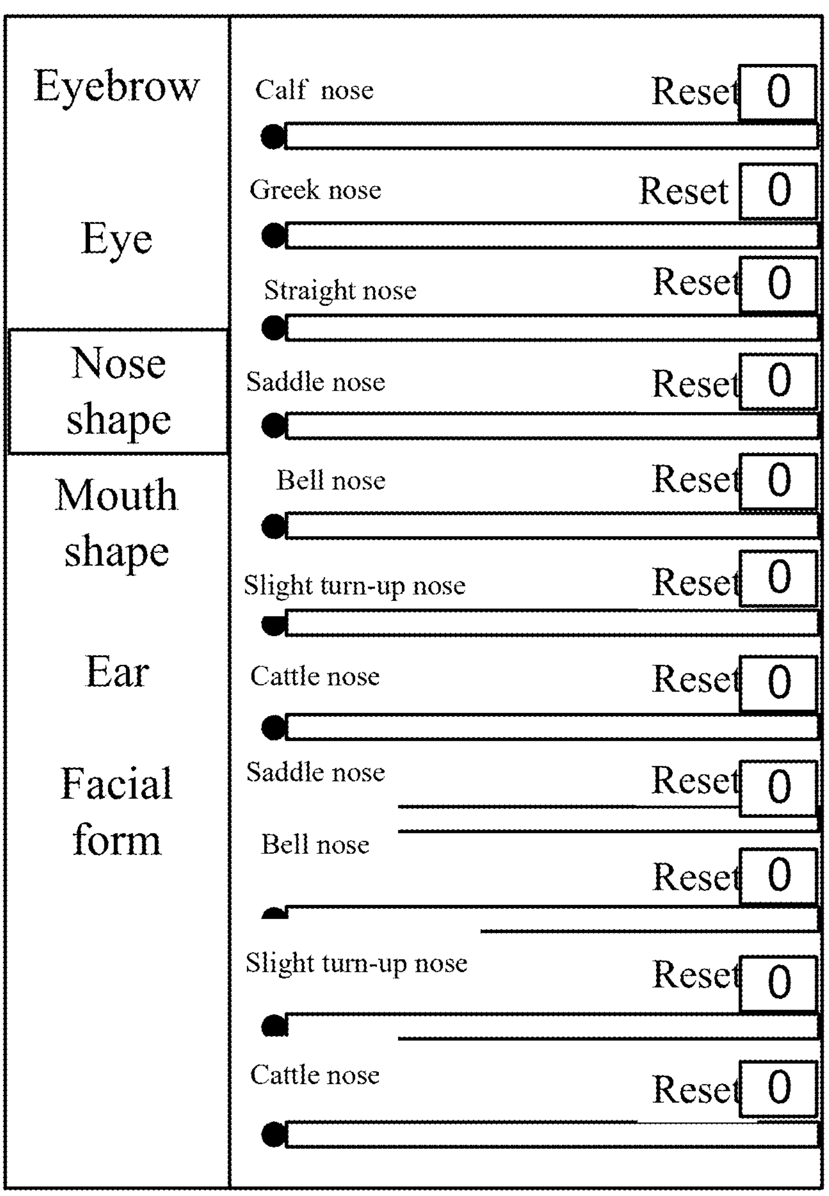
FIG. 3 is a schematic interface display diagram of attribute information of a head key feature in the present disclosure.

For example, FIG. 3 is a schematic interface display diagram of the attribute information of one head key feature in the present disclosure. As shown in FIG. 3, in the digital human generation platform, as an example, the head key feature is the nose, and the various nose shapes shown in FIG. 3 are nose shapes supported for use in the feature library in the digital human generation platform. When the user clicks on the nose shape, the interface shown in FIG. 3 may be presented, the user may select a best matched nose shape based on the nose shape in the picture of the to-be-generated digital human, and the user may also reset the currently selected nose shape to 0 and reselect a nose shape.

S206: registering the point cloud of the head key feature with the target object model; executing step S207.

The registration of this embodiment may be adjusted using at least one operation manner of shifting, rotating, scaling, or the like. For example, specifically, the point cloud of the head key feature may be adjusted to allow a coordinate system of the point cloud of the head key feature to be consistent with the target object model, and allow a size of the point cloud of the head key feature to be consistent with a size of a region of the head key feature of the target object model, such that the point cloud of the head key feature may be accurately and efficiently matched with the target object model.

S207: migrating the point cloud of the head key feature to a corresponding head key feature region in the target object model; executing step S208.

S208: detecting whether similarity between a head key feature in the processed target object model and the head key feature in the picture is larger than or equal to a preset similarity threshold; if yes, returning to the step S203; otherwise, executing step S209.

For example, specifically, the similarity therebetween may be calculated by capturing the head key feature in a front view of the target object model after the fusion and the head key feature in the picture and then using a similarity calculation model trained in advance. Alternatively, a feature expression of the head key feature region in the front view in the target object model after the fusion and a feature expression of the head key feature in the picture can be extracted by a pre-trained feature expression model, and then, the similarity between the two feature expressions is calculated as the similarity therebetween.

Based on this step, it can be known that in practical application, the situation that an ideal effect is achieved after the head key feature is fused also exists, and at this point, a face pinching operation is not performed on the head key feature.

S209: based on triggering of the user, carrying out a face pinching operation on the point cloud of the head key feature fused to the target object model; returning to the step S208.

The face pinching operation of this embodiment is performed on the point cloud of the head key feature fused to the target object model based on the triggering of the user with a pre-established implicit constraint surface and a preset dynamic curve as constraints. This step may specifically include the following steps:

(1) acquiring action information of a first controller configured on the implicit constraint surface triggered by the user.

Before the first controller is adjusted, the implicit constraint surface is a surface consistent with a topological structure of a surface of the target object model, and identifications and positions of included points are identical; the implicit constraint surface is provided with a plurality of first controllers, but the implicit constraint surface is invisible to the user; with a first motion mapping relationship existing between each first controller and the point on the implicit constraint surface, when the first controller acts, the point on the implicit constraint surface can be driven to move.

In the embodiment of the present disclosure, since the main features of the digital human figure are concentrated on the head, the fusing and face pinching operations are also mainly performed on the head key feature of the target object model. At this point, topological structures of the implicit constraint surface and the target object model are limited to the head of the digital human. In this embodiment, the action information of the first controller may include a motion direction and displacement of the first controller.

(2) acquiring action information of a triggered point on the implicit constraint surface based on the first motion mapping relationship between the first controller on the pre-established implicit constraint surface and the point on the implicit constraint surface and the action information of the first controller.

Optionally, in this embodiment, 85 or more available first controllers can be designed on the implicit constraint surface according to facial features, muscle directions, bone root positions, or the like. 20,000 or more point clouds may exist on the target object model. Therefore, one first controller may trigger the motion of a plurality of points on the target object model. When triggering the first controller, the user may only trigger the motion of one first controller, or the motion of a plurality of first controllers at the same time. For example, a control interface may prompt the user to select the first controller to be triggered, and after determination, the user may trigger the motion for all the selected first controllers simultaneously. The action information of the point in this embodiment may also include a motion direction and displacement of the point.

Specifically, the final action information of each point may be determined by performing a weighted summation based on motion information of the point triggered by each of the plurality of first controllers and a weight of each first controller, and then, a motion position of the point may be determined.

The implicit constraint surface of this embodiment mainly aims to solve unreasonable situations caused by large physical changes; for example, a change of the calvarium is transmitted to the forehead, the lateral side, the afterbrain and the neck using the constraint, such that physics and aesthetics of the target object model are ensured to a certain extent, and an aesthetic degree of the generated digital human can be effectively improved.

(3) based on the action information of the triggered point on the implicit constraint surface, determining action information of a second controller at the same position as the point on the target object model.

In this embodiment, some second controllers are deployed on the points of the target object model. In the control process, after the point on the implicit constraint surface is triggered to move, the second controller deployed on the same identified point on the target object model is required to perform a synchronous action along with the action of the point on the implicit constraint surface.

(4) controlling action information of the point on the target object model based on a second motion mapping relationship between the second controller configured on the pre-established target object model and the point on the target object model and the action information of the second controller.

In this embodiment, 550 or more second controllers are also configured on the target object model. Similarly, each second controller also establishes a binding relationship with a plurality of points of the target object model, for example, establishes the second motion mapping relationship described above. A number of the second controllers is larger than a number of the first controllers, thus enabling finer control of the points on the target object model.

Based on the step (3), it can be known that after the action of the triggered point on the implicit constraint surface, the second controller deployed on the same identified point on the target object model synchronously moves along with the action of the point, and then, according to the second motion mapping relationship between the second controller configured on the target object model and the point on the target object model, the action information of all the points bound to the second controller on the target object model can be acquired, and then, the action of the corresponding point is controlled based on the action information of the point on the target object model. In the process, the action of the first controller on the implicit constraint surface can be transmitted to the action of the point on the target object model, such that the target object model can be accurately adjusted.

(5) with a preset dynamic curve as a constraint, adjusting a position of the point cloud of the head key feature fused to the target object model.

For example, the step (5) may include the following steps during implementation:

(a) detecting whether the second controller is on the preset dynamic curve or not; at least two second controllers being configured on each preset dynamic curve.

The preset dynamic curves in this embodiment may be some natural curves of the face of the target object model, such as a mandible line, a lower jaw line, a nasolabial fold, or the like. In the face pinching optimization process, when the regions, such as the mandible line, the lower jaw line, the nasolabial fold, or the like, are adjusted, a single controller cannot easily achieve a continuous, smooth and natural topological effect. Therefore, in this embodiment, the dynamic curve is introduced, such that the dynamic curve can be more continuous, smoother and more natural by controlling the motion of at least two second controllers on the dynamic curve.

(b) in response to the determination that the second controller is on the preset dynamic curve, acquiring the action information of other second controllers on the dynamic curve based on the action information of the second controller.

(c) adjusting the position of the point cloud of the head key feature fused to the target object model based on the action information of the second controller and the action information of the other second controllers on the dynamic curve.

Further, in response to the determination that the second controller is not on the preset dynamic curve, the method may further include: adjusting the position of the point cloud of the head key feature fused to the target object model based on the action information of the second controller.

Based on the above description, it can be understood that the dynamic curve constraint has a core that the plurality of consecutive same-level second controllers are connected in series by using one space curve. In a fixed end point case, a position change and a rotation change of each second controller are transmitted to a periphery thereof, a weight of a second controller which is closer to the second controller is larger, and conversely, the weight of a second controller which is farther from the second controller and closer to an end point is smaller. A relationship between the weight and the distance is also configured in advance.

In this embodiment, when the face pinching operation is performed on the point cloud of the head key feature fused to the target object model based on the action information of the second controller and the action information of the other second controllers on the dynamic curve, points around the adjusted point are also required to be smoothed. In this embodiment, a feature curve where the point is located serves as a constraint for adjustment.

For example, the surface of the target object model is of a grid structure consisting of a plurality of points and sides between adjacent points. Therefore, when a certain point is adjusted, in a topology level, the feature curve where the point is located can be used as a center, and adjacent topology lines are also required to be updated to a certain extent, so as to guarantee uniformity and smoothness of topology. In the process, a dynamic weight is mainly used for transition from the feature curve to a contour, and meanwhile, a tangent, a normal and UV are used to carry out auxiliary smooth detection. A magnitude of outward attenuation is adjusted during the transition from the feature curve to the contour. In other words, in order to enable smoother adjustment, in practical application, a change of one feature curve may be attenuated outwards by a preset number of feature curves. The preset number may be set according to actual requirements, and may be 6, 8, 10 or other values, for example. The adjustment magnitude of the feature curve where the point is located is largest, adjustment magnitudes of a preset number of adjacent feature curves are reduced gradually with an increase of a distance from the feature curve where the point is located until a last step of the current adjustment of the last curve of the preset number of adjacent feature curves is completed.

The dynamic curve constraint of this embodiment ensures that all the second controllers on the curve are smooth at all times during the operation. Further, control of the second controller can be transmitted onto the surface and the point, thus guaranteeing topological uniformity of the target object model. In a real-time operation, the user is allowed to complete a special and large-scale operation, and on a modeling level, topological normalization is guaranteed.

In this embodiment, binding logic is established between the point cloud of the implicit constraint surface and the target object model, and the logic is simple but effective. For example, a binding relationship is established between the first controller on the implicit constraint surface and the point on the implicit constraint surface, a binding relationship is also established between the second controller on the target object model and the point on the target object model, and the action of the point on the implicit constraint surface can be transmitted to the second controller on the target object model at the point, which is equivalent to the fact that a binding relationship also exists between a certain second controller on the target object model and a certain point on the implicit constraint surface, and then, the position change of the point on the implicit constraint surface is influenced by a weight and transmitted to the corresponding second controller at the point. Meanwhile, tangent and normal changes of the point are transmitted to rotation of the corresponding second controller using weights, thus driving the motion of the other points on the target object model bound to the second controller.

Based on the above description, it can be understood that, in this embodiment, after point cloud updating, the 85 or more first controllers established on the implicit constraint surface can be mapped onto the 550 or more second controllers on the surface of the target object model using the binding relationship, and then further updated onto the 20,000 or more point clouds on the surface of the target object model, such that finer control can be achieved, and the generated digital human is more vivid and accurate.

In this embodiment, the implicit constraint surface and dynamic curve constraints are used during face pinching, such that the topological effect of the target object model is always constrained in the operation, thus guaranteeing rapid use of a product and commonality and normalization of product output, effectively guaranteeing accuracy and normalization of the generated digital human, and effectively improving the efficiency of generating the digital human.

S210: detecting whether an accessory template of the target object model fits the generated digital human figure; if yes, obtaining the digital human figure; if no, executing step S211.

S211: adjusting the accessory template in the digital human figure to allow the accessory template to fit the digital human figure.

In this embodiment, the step S211 is executed in response to the fact that the accessory template of the target object model does not fit the generated digital human figure. If the template fits the figure, the perfect digital human figure is obtained.

The accessory template of this embodiment includes at least one of an eyeball template, a tooth template, an AO template and a lacrimal gland template. AO refers to the eyeshell which is named as AO in the object model of the digital human. For example, when the eyeball template is too large, the eyes of the digital human may not be closed, and at this point, the eyeball template is required to be reduced. When the eyeball template is too small, a gap may exist between the eyeball template and the digital human figure when the digital human opens the eyes, and at this point, the eyeball template is required to be amplified. Similarly, when the tooth template is too large, the mouth of the digital human may not be closed tightly, and at this point, the tooth template is required to be reduced. When the tooth template is too small, a gap between the mouth and the tooth template may be too large when the digital human opens the mouth, and at this point, the tooth template is required to be amplified. Similarly, adjustment principles of the AO template and the lacrimal gland template are the same and are not repeated herein. With the processing of this step, the finally obtained digital human figure can be more accurate, more vivid and more perfect.

After the step S211, one perfect digital human figure can be obtained; the digital human figure can be matched with the features in the picture through the feature fusion and face pinching operations, the topological structure of the generated digital human figure can be effectively normalized through the face pinching adjustment constrained by the implicit constraint surface and the dynamic curve, and the accuracy of the generated digital human figure is ensured.

It should be noted that, in the step S203, as an example, the plurality of head key features included in the picture can all be fused; in practical application, the head key feature corresponding to the target attribute information may not be included in the feature library, and at this point, the face pinching operation may be performed on the point cloud of the head key feature in the target object model based on triggering of the user. Reference is made to the above related description for a manner of the face pinching operation, which is not repeated herein. Face pinching is stopped after the similarity between the head key feature in the target object model and the head key feature in the picture after face pinching is larger than or equal to the preset similarity threshold.

Compared with the traditional technology, a figure making cost of the digital human generation method according to this embodiment is greatly reduced. A traditional digital human figure making process requires a great amount of manpower and lasts for several months, and by using the technical solution, the features of a scanned body can be reasonably combined quickly, a face pinching tool is used for gradual modification, and a figure generation period is greatly shortened to be within several days.

Moreover, the digital human generation method according to this embodiment can effectively improve quality of the digital human figure. Based on the preset target object model, the digital human figure is generated through the fusion and face pinching operations, and the quality of the generated digital human is still kept on the premise that the generation efficiency of the digital human is greatly improved. The generated digital human figure is further subjected to accessory template fitting detection, and adjustment is performed when the figure does not fit the template, thus further guaranteeing the quality of the generated digital human.

Figure 4:
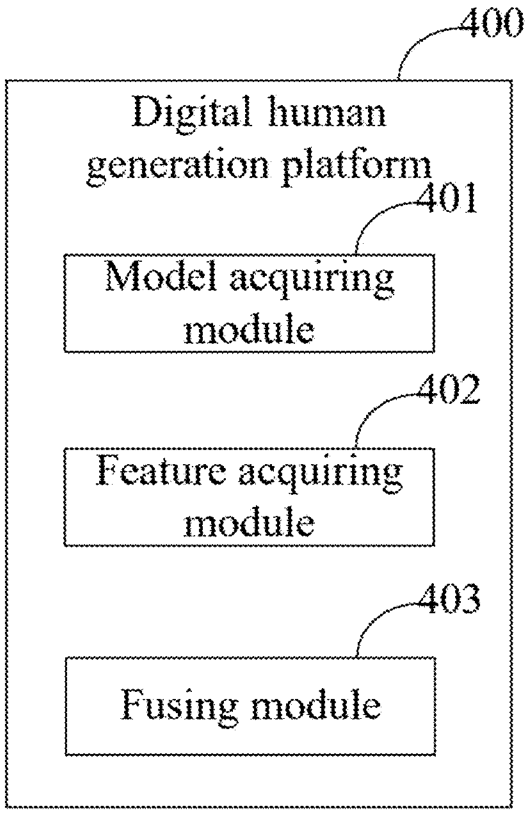
FIG. 4 is a schematic diagram according to a third embodiment of the present disclosure.

FIG. 4 is a schematic diagram according to a third embodiment of the present disclosure; as shown in FIG. 4, this embodiment provides a digital human generation platform 400, including:

a model acquiring module 401 configured to acquire a corresponding target object model based on a picture of a to-be-generated digital human;

a feature acquiring module 402 is configured to acquire a corresponding point cloud of a head key feature in the picture from a pre-configured feature library based on the head key feature; and a fusing module 403 configured to fuse the point cloud of the head key feature in the target object model to obtain a digital human figure.

The digital human generation platform 400 according to this embodiment has the same implementation as the above-mentioned relevant method embodiment by adopting the above-mentioned modules to implement the implementation principle and the technical effects of the digital human generation, and for details, reference may be made to the description of the above-mentioned relevant method embodiment, and details are not repeated herein.

Figure 5:
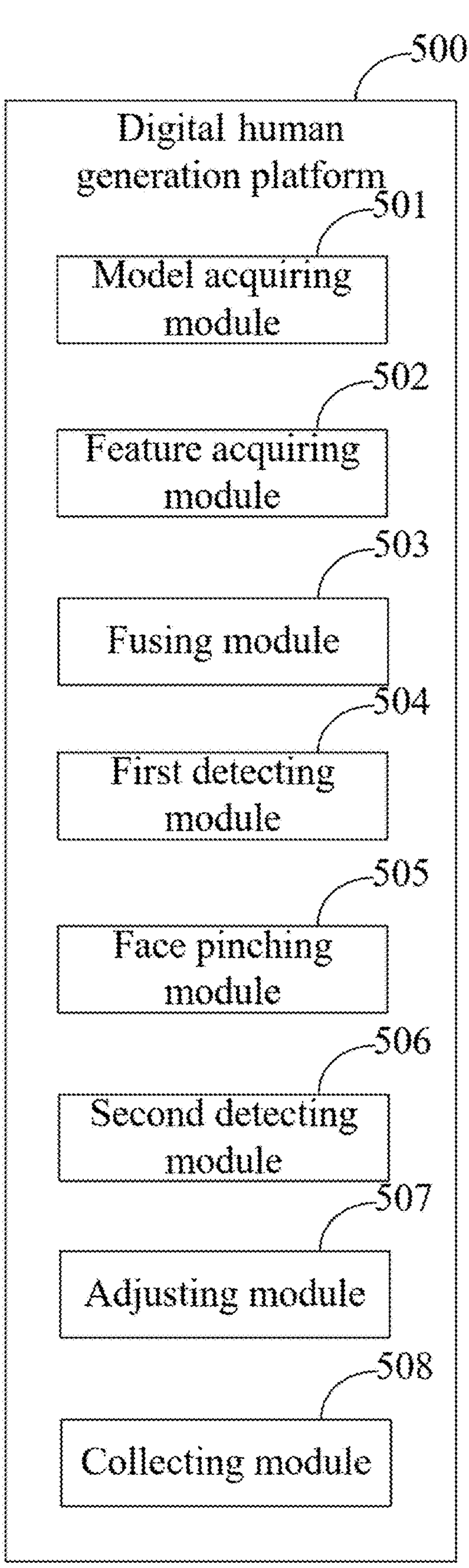
FIG. 5 is a schematic diagram according to a fourth embodiment of the present disclosure.

FIG. 5 is a schematic diagram according to a fourth embodiment of the present disclosure; the technical solution of a digital human generation platform 500 according to this embodiment of the present disclosure is further described in more detail based on the above-mentioned embodiment shown in FIG. 4. As shown in FIG. 5, the digital human generation platform 500 according to this embodiment includes same modules with the same functions as those of the digital human generation platform shown in FIG. 4: a model acquiring module 501, a feature acquiring module 502 and a fusing module 503.

As shown in FIG. 5, the digital human generation platform 500 according to this embodiment further includes:

a first detecting module 504 configured to detect whether similarity between a head key feature in the target object model after the fusion and the head key feature in the picture is larger than or equal to a preset similarity threshold; and a face pinching module 505 configured to, in response to the determination that the similarity is smaller than the preset similarity threshold, based on triggering of a user, carry out a face pinching operation on the point cloud of the head key feature fused to the target object model.

Further optionally, in one embodiment of the present disclosure, the face pinching module 505 is configured to:

perform the face pinching operation on the point cloud of the head key feature fused to the target object model based on the triggering of the user with a pre-established implicit constraint surface and a preset dynamic curve as constraints.

Further optionally, in one embodiment of the present disclosure, the face pinching module 505 is configured to:

acquire action information of a first controller configured on the implicit constraint surface triggered by the user; before control, the implicit constraint surface being a surface completely consistent with a topological structure of a surface of the target object model; the implicit constraint surface being invisible to the user;

acquire action information of a triggered point on the implicit constraint surface based on the first motion mapping relationship between the first controller on the pre-established implicit constraint surface and the point on the implicit constraint surface and the action information of the first controller;

based on the action information of the triggered point on the implicit constraint surface, determine action information of a second controller at the same position as the point on the target object model;

control action information of the point on the target object model based on a second motion mapping relationship between the second controller configured on the pre-established target object model and the point on the target object model and the action information of the second controller; and with a preset dynamic curve as a constraint, adjust a position of the point cloud of the head key feature fused to the target object model.

Further optionally, in one embodiment of the present disclosure, the face pinching module 505 is configured to:

detect whether the second controller is on the preset dynamic curve or not; at least two second controllers being configured on each preset dynamic curve;

in response to the determination that the second controller is on the preset dynamic curve, acquire the action information of other second controllers on the dynamic curve based on the action information of the second controller; and adjust the position of the point cloud of the head key feature fused to the target object model based on the action information of the second controller and the action information of the other second controllers on the dynamic curve.

Further optionally, in one embodiment of the present disclosure, the face pinching module 505 is further configured to:

in response to the determination that the second controller is not on the preset dynamic curve, adjust the position of the point cloud of the head key feature fused to the target object model based on the action information of the second controller.

Further optionally, as shown in FIG. 5, in one embodiment of the present disclosure, the digital human generation platform 500 further includes:

a second detecting module 506 configured to detect whether an accessory template of the target object model fits the digital human figure; and an adjusting module 507 configured to, in response to the determination that the accessory template of the target object model does not fit the digital human figure, adjust the accessory template in the digital human figure.

Further optionally, in one embodiment of the present disclosure, the model acquiring module 501 is configured to:

extract attribute features of the digital human based on the picture of the to-be-generated digital human; and acquire the corresponding target object model from a preset model library based on the attribute features of the digital human; the model library including a plurality of object models.

Further optionally, in one embodiment of the present disclosure, the model acquiring module 501 is configured to:

if the attribute features of the digital human are not extracted based on the picture of the to-be-generated digital human, use a pre-configured standard model as the target object model.

Further optionally, in one embodiment of the present disclosure, the feature acquiring module 502 is configured to:

acquire target attribute information of the head key feature in the picture; and acquire the corresponding point cloud of the head key feature from the feature library based on the target attribute information of the head key feature.

Further optionally, in one embodiment of the present disclosure, the face pinching module 505 is further configured to:

if the head key feature corresponding to the target attribute information is not included in the feature library, perform the face pinching operation on the point cloud of the head key feature in the target object model based on triggering of the user.

Further optionally, as shown in FIG. 5, in one embodiment of the present disclosure, the digital human generation platform 500 further includes:

a collecting module 508 configured to collect point clouds of a plurality of head key features of each of a plurality of characters and attribute information of the head key features, and store the point clouds and the attribute information in the feature library.

Further optionally, in one embodiment of the present disclosure, the fusing module 503 is configured to:

register the point cloud of the head key feature with the target object model; and migrate the point cloud of the head key feature to a corresponding head key feature region in the target object model.

The digital human generation platform 500 according to this embodiment has the same implementation as the above-mentioned relevant method embodiment by adopting the above-mentioned modules to implement the implementation principle and the technical effects of the digital human generation, and for details, reference may be made to the description of the above-mentioned relevant method embodiment, and details are not repeated herein.

According to the embodiment of the present disclosure, there are also provided an electronic device, a readable storage medium and a computer program product.

Figure 6:
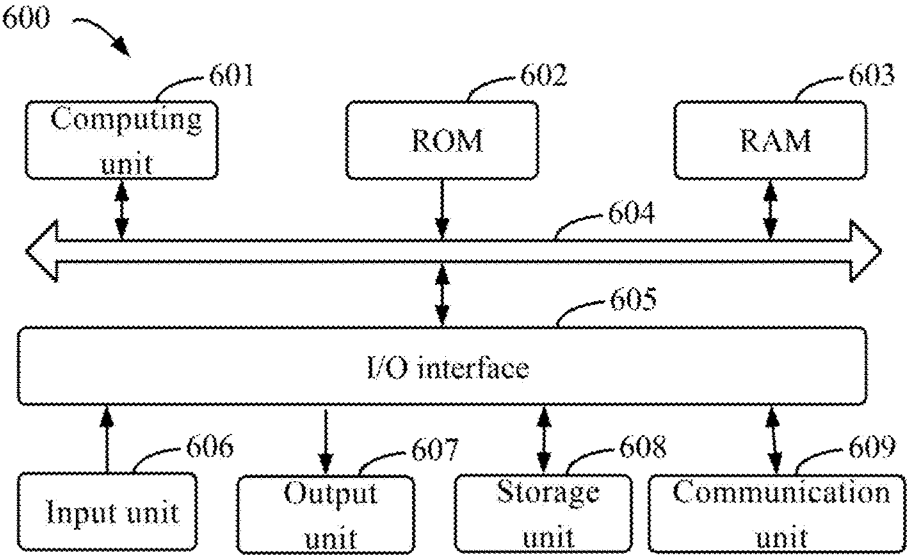
FIG. 6 is a block diagram of an electronic device configured to implement a method according to the embodiment of the present disclosure.

FIG. 6 shows a schematic block diagram of an exemplary electronic device 600 which may be configured to implement the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 600 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method according to the present disclosure. For example, in some embodiments, the method according to the present disclosure may be implemented as a computer software program tangibly contained in a machine readable medium, such as the storage unit 608. In some embodiments, part or all of the computer program may be loaded and/or installed into the device 600 via the ROM 602 and/or the communication unit 609. When the computer program is loaded into the RAM 603 and executed by the computing unit 601, one or more steps of the method according to the present disclosure may be performed. Alternatively, in other embodiments, the computing unit 601 may be configured to perform the method according to the present disclosure by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server or a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A digital human generation method, comprising:

acquiring a corresponding target object model based on a picture of a to-be-generated digital human;

acquiring a corresponding point cloud of a head key feature in the picture from a pre-configured feature library based on the head key feature; and fusing the point cloud of the head key feature in the target object model to obtain a digital human figure, wherein the method further comprises:

after fusing the point cloud of the head key feature in the target object model, and before obtaining the digital human figure, detecting whether similarity between the head key feature in the target object model after the fusion and the head key feature in the picture is larger than or equal to a preset similarity threshold; and in response to the determination that the similarity is smaller than the preset similarity threshold, carrying out a face pinching operation on the point cloud of the head key feature fused to the target object model based on triggering of a user with a pre-established implicit constraint surface and a preset dynamic curve as constraints.

2. The method according to claim 1, wherein carrying out the face pinching operation on the point cloud of the head key feature fused to the target object model based on the triggering of the user with the pre-established implicit constraint surface and the preset dynamic curve as constraints comprises:

acquiring action information of a first controller configured on the implicit constraint surface triggered by the user; before control, the implicit constraint surface being a surface completely consistent with a topological structure of a surface of the target object model; the implicit constraint surface being invisible to the user;

acquiring action information of a triggered point on the implicit constraint surface based on a first motion mapping relationship between the first controller on the pre-established implicit constraint surface and the point on the implicit constraint surface and the action information of the first controller;

based on the action information of the triggered point on the implicit constraint surface, determining action information of a second controller at the same position as the point on the target object model;

controlling action information of the point on the target object model based on a second motion mapping relationship between the second controller configured on the pre-established target object model and the point on the target object model and the action information of the second controller; and with a preset dynamic curve as a constraint, adjusting a position of the point cloud of the head key feature fused to the target object model.

3. The method according to claim 2, wherein with the preset dynamic curve as the constraint, adjusting the position of the point cloud of the head key feature fused to the target object model comprises:

detecting whether the second controller is on the preset dynamic curve or not; at least two second controllers being configured on each preset dynamic curve;

in response to the determination that the second controller is on the preset dynamic curve, acquiring the action information of other second controllers on the dynamic curve based on the action information of the second controller; and adjusting the position of the point cloud of the head key feature fused to the target object model based on the action information of the second controller and the action information of the other second controllers on the dynamic curve.

4. The method according to claim 3, wherein with the preset dynamic curve as the constraint, adjusting the position of the point cloud of the head key feature fused to the target object model further comprises:

in response to the determination that the second controller is not on the preset dynamic curve, adjusting the position of the point cloud of the head key feature fused to the target object model based on the action information of the second controller.

5. The method according to claim 1, further comprising: after carrying out the face pinching operation on the point cloud of the head key feature fused to the target object model based on the triggering of the user, detecting whether an accessory template of the target object model fits the digital human figure; and in response to the determination that the accessory template of the target object model does not fit the digital human figure, adjusting the accessory template in the digital human figure.

6. The method according to claim 1, wherein acquiring the corresponding target object model based on the picture of the to-be-generated digital human comprises:

extracting attribute features of the digital human based on the picture of the to-be-generated digital human; and acquiring the corresponding target object model from a preset model library based on the attribute features of the digital human; the model library comprising a plurality of object models.

7. The method according to claim 6, wherein acquiring the corresponding target object model based on the picture of the to-be-generated digital human comprises:

if the attribute features of the digital human are not extracted based on the picture of the to-be-generated digital human, using a pre-configured standard model as the target object model.

8. The method according to claim 1, wherein acquiring the corresponding point cloud of the head key feature in the picture from the pre-configured feature library based on the head key feature comprises:

acquiring target attribute information of the head key feature in the picture; and acquiring the corresponding point cloud of the head key feature from the feature library based on the target attribute information of the head key feature.

9. The method according to claim 8, further comprising:

if the head key feature corresponding to the target attribute information is not comprised in the feature library, carrying out the face pinching operation on the point cloud of the head key feature in the target object model based on triggering of the user.

10. The method according to claim 1, further comprising: before acquiring the corresponding point cloud of the head key feature in the picture from the pre-configured feature library based on the head key feature, collecting point clouds of a plurality of head key features of each of a plurality of characters and attribute information of the head key features, and store the point clouds and the attribute information in the feature library.

11. The method according to claim 1, wherein fusing the point cloud of the head key feature in the target object model comprises:

registering the point cloud of the head key feature with the target object model; and migrating the point cloud of the head key feature to a corresponding head key feature region in the target object model.

12. An electronic device, comprising:

at least one processor; and a memory connected with the at least one processor communicatively;

wherein the memory stores instructions executable by the at least one processor to enable the at least one processor to perform a digital human generation method, comprising:

acquiring a corresponding target object model based on a picture of a to-be-generated digital human;

acquiring a corresponding point cloud of a head key feature in the picture from a pre-configured feature library based on the head key feature; and fusing the point cloud of the head key feature in the target object model to obtain a digital human figure, wherein the method further comprises:

after fusing the point cloud of the head key feature in the target object model, and before obtaining the digital human figure, detecting whether similarity between the head key feature in the target object model after the fusion and the head key feature in the picture is larger than or equal to a preset similarity threshold; and in response to the determination that the similarity is smaller than the preset similarity threshold, carrying out a face pinching operation on the point cloud of the head key feature fused to the target object model, based on triggering of a user, with a pre-established implicit constraint surface and a preset dynamic curve as constraints.

13. The electronic device according to claim 12, wherein carrying out the face pinching operation on the point cloud of the head key feature fused to the target object model based on the triggering of the user with the pre-established implicit constraint surface and the preset dynamic curve as constraints comprises:

acquiring action information of a first controller configured on the implicit constraint surface triggered by the user; before control, the implicit constraint surface being a surface completely consistent with a topological structure of a surface of the target object model; the implicit constraint surface being invisible to the user;

acquiring action information of a triggered point on the implicit constraint surface based on a first motion mapping relationship between the first controller on the pre-established implicit constraint surface and the point on the implicit constraint surface and the action information of the first controller;

based on the action information of the triggered point on the implicit constraint surface, determining action information of a second controller at the same position as the point on the target object model;

controlling action information of the point on the target object model based on a second motion mapping relationship between the second controller configured on the pre-established target object model and the point on the target object model and the action information of the second controller; and with a preset dynamic curve as a constraint, adjusting a position of the point cloud of the head key feature fused to the target object model.

14. The electronic device according to claim 13, wherein with the preset dynamic curve as the constraint, adjusting the position of the point cloud of the head key feature fused to the target object model comprises:

detecting whether the second controller is on the preset dynamic curve or not; at least two second controllers being configured on each preset dynamic curve;

in response to the determination that the second controller is on the preset dynamic curve, acquiring the action information of other second controllers on the dynamic curve based on the action information of the second controller; and adjusting the position of the point cloud of the head key feature fused to the target object model based on the action information of the second controller and the action information of the other second controllers on the dynamic curve.

15. The electronic device according to claim 14, wherein with the preset dynamic curve as the constraint, adjusting the position of the point cloud of the head key feature fused to the target object model further comprises:

in response to the determination that the second controller is not on the preset dynamic curve, adjusting the position of the point cloud of the head key feature fused to the target object model based on the action information of the second controller.

16. A non-transitory computer readable storage medium with computer instructions stored thereon, wherein the computer instructions are used for causing a computer to perform a digital human generation method, comprising:

acquiring a corresponding target object model based on a picture of a to-be-generated digital human;

acquiring a corresponding point cloud of a head key feature in the picture from a pre-configured feature library based on the head key feature; and fusing the point cloud of the head key feature in the target object model to obtain a digital human figure, wherein the method further comprises:

after fusing the point cloud of the head key feature in the target object model, and before obtaining the digital human figure, detecting whether similarity between the head key feature in the target object model after the fusion and the head key feature in the picture is larger than or equal to a preset similarity threshold; and in response to the determination that the similarity is smaller than the preset similarity threshold, carrying out a face pinching operation on the point cloud of the head key feature fused to the target object model, based on triggering of a user, with a pre-established implicit constraint surface and a preset dynamic curve as constraints.

* * * * *